United States Patent
Kamalakantha et al.

(10) Patent No.: US 10,469,448 B2
(45) Date of Patent: Nov. 5, 2019

(54) FIREWALL PORT ACCESS RULE GENERATION

(71) Applicant: HEWLETT PACKARD ENTERPRISE DEVELOPMENT LP, Houston, TX (US)

(72) Inventors: Chandra H. Kamalakantha, Plano, TX (US); Parag M. Doshi, Marietta, GA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 120 days.

(21) Appl. No.: 15/500,034

(22) PCT Filed: Sep. 5, 2014

(86) PCT No.: PCT/US2014/054400
§ 371 (c)(1),
(2) Date: Jan. 28, 2017

(87) PCT Pub. No.: WO2016/036391
PCT Pub. Date: Mar. 10, 2016

(65) Prior Publication Data
US 2017/0244671 A1   Aug. 24, 2017

(51) Int. Cl.
*H04L 29/06* (2006.01)
*H04L 12/22* (2006.01)
*H04L 29/12* (2006.01)
*H04L 12/46* (2006.01)

(52) U.S. Cl.
CPC ...... *H04L 63/0236* (2013.01); *H04L 12/22* (2013.01); *H04L 12/4641* (2013.01); *H04L 61/2007* (2013.01); *H04L 61/2061* (2013.01); *H04L 61/6068* (2013.01); *H04L 63/0263* (2013.01)

(58) Field of Classification Search
CPC .................................................. H04L 63/0236
See application file for complete search history.

(56) References Cited

U.S. PATENT DOCUMENTS

| | | | |
|---|---|---|---|
| 6,151,631 A * | 11/2000 | Ansell | G06Q 10/087 709/229 |
| 8,272,061 B1 | 9/2012 | Lotem et al. | |
| 8,788,707 B1 | 7/2014 | Su | |
| 8,855,009 B2 * | 10/2014 | Niiyama | G07C 5/085 370/254 |

(Continued)

FOREIGN PATENT DOCUMENTS

CN  102307185  1/2012

OTHER PUBLICATIONS

International Searching Authority, "Notification of Transmittal of the International Search Report & Written Opinion", PCT/US2014/05440, dated May 19, 2015, 11 pages.

(Continued)

*Primary Examiner* — Jason Chiang
(74) *Attorney, Agent, or Firm* — Hewlett Packard Enterprise Patent Department (57) ABSTRACT

A method includes generating firewall port access rules between a first cloud system a second cloud system for each tenant of a plurality of tenants. A unique IP address range is generated for each tenant. The firewall port access rules are applied to each IP address.

15 Claims, 6 Drawing Sheets

(56) References Cited

U.S. PATENT DOCUMENTS

| | | | |
|---|---|---|---|
| 9,251,114 B1* | 2/2016 | Ancin | G06F 15/17331 |
| 9,979,602 B1* | 5/2018 | Chinnakannan | H04L 41/12 |
| 2009/0288084 A1* | 11/2009 | Astete | G06F 9/45533 |
| | | | 718/1 |
| 2012/0131156 A1 | 5/2012 | Brandt et al. | |
| 2012/0180039 A1 | 7/2012 | Bravery et al. | |
| 2012/0185913 A1* | 7/2012 | Martinez | G06F 9/455 |
| | | | 726/1 |
| 2012/0317611 A1 | 12/2012 | Kashyap | |
| 2013/0019277 A1 | 1/2013 | Chang et al. | |
| 2013/0058346 A1 | 3/2013 | Sridharan et al. | |
| 2013/0185404 A1* | 7/2013 | Patel | H04L 61/2557 |
| | | | 709/222 |
| 2013/0191257 A1* | 7/2013 | Koodli | H04L 12/4633 |
| | | | 705/34 |
| 2013/0304917 A1 | 11/2013 | Mittal et al. | |
| 2013/0347095 A1* | 12/2013 | Barjatiya | H04L 63/0209 |
| | | | 726/13 |
| 2014/0040999 A1 | 2/2014 | Zhang et al. | |
| 2014/0115584 A1* | 4/2014 | Mudigonda | H04L 67/1095 |
| | | | 718/1 |
| 2014/0173060 A1* | 6/2014 | Jubran | G06F 9/5061 |
| | | | 709/220 |
| 2014/0289791 A1* | 9/2014 | Acharya | H04L 63/0236 |
| | | | 726/1 |
| 2014/0376367 A1* | 12/2014 | Jain | H04L 47/20 |
| | | | 370/230 |
| 2015/0040125 A1* | 2/2015 | Anderson | G06F 9/45533 |
| | | | 718/1 |
| 2015/0128245 A1* | 5/2015 | Brown | H04L 47/323 |
| | | | 726/12 |

OTHER PUBLICATIONS

Levenstein, K., "Rackspace Support Network. Rackspace Private Cloud Security White Paper", Rackspace Support Network, Jun. 17, 2014, 6 pages, Article ID: 3763.

Siwczak, P., "OpenStack Networking for Scalability and Multi-Tenancy With Vlanmanager", OpenStack (Web Page), Aug. 7, 2012, 18 pages.

Unknown, "OpenStack and VMWare", Apitra, 2013, 1 page.

Coles, A.; et al.; "Cells: A Self-Hosting Virtual Infrastructure Service", Nov. 5, 2012 pp. 57-64.

OpenStack.org, "OpenStack Networking Administration Guide"; Feb. 4, 2013; 97 pages; XP055226586.

* cited by examiner

| TENANT | TRAFFIC ORIGINATION | TRAFFIC DESTINATION | ALLOW OR BLOCK | PORT RANGE | PTOTOCOL | SOURCE |
|---|---|---|---|---|---|---|
| TENANT A | CLOUD 1 | CLOUD 2 TENANT PROJECT | ALLOW | 22 | SSH | TENANT VLANs |
| TENANT A | CLOUD 1 | CLOUD 2 OTHER TENANTS IP RANGE | BLOCK | 22 | SSH | TENANT VLANs |
| TENANT A | CLOUD 2 TENANT PROJECT | CLOUD 1 | ALLOW | 22 | SSH | 10.0.0.1-10.0.0.10 |
| | | | | | | |
| TENANT B | CLOUD 1 | CLOUD 2 TENANT PROJECT | ALLOW | 22 | SSH | TENANT VLANs |
| TENANT B | CLOUD 1 | CLOUD 2 TENANT PROJECT | BLOCK | 22 | SSH | TENANT VLANs |
| TENANT B | CLOUD 1 | CLOUD 2 TENANT PROJECT | BLOCK | 22 | SSH | TENANT VLANs |
| TENANT B | CLOUD 2 TENANT PROJECT | CLOUD 1 | ALLOW | 22 | SSH | 10.0.0.11-10.0.0.20 |
| | | | | | | |
| TENANT C | CLOUD 1 | CLOUD 2 TENANT PROJECT | ALLOW | 22 | SSH | TENANT VLANs |
| TENANT C | CLOUD 1 | CLOUD 2 TENANT PROJECT | BLOCK | 22 | SSH | TENANT VLANs |
| TENANT C | CLOUD 1 | CLOUD 2 TENANT PROJECT | BLOCK | 22 | SSH | TENANT VLANs |
| TENANT C | CLOUD 2 TENANT PROJECT | CLOUD 1 | ALLOW | 22 | SSH | 10.0.0.21-10.0.0.30 |

FIG. 6

ENDING OCTET IP ADDRESS VALUE

| | FIXED IP QUOTA = 40 | | | | VARIABLE IP QUOTA | |
|---|---|---|---|---|---|---|
| TENANT (n) | 3rd OCTET (X) | 4th OCTET (Y) | IP QUOTA (Δ) | IP INTEGER | 3rd OCTET (X) | 4th OCTET (Y) |
| 1 | 0 | 40 | 40 | 40 | 0 | 40 |
| 2 | 0 | 80 | 40 | 80 | 0 | 90 |
| 3 | 0 | 120 | 80 | 160 | 0 | 160 |
| 4 | 0 | 160 | 20 | 180 | 0 | 180 |
| 5 | 0 | 200 | 40 | 220 | 0 | 220 |
| 6 | 0 | 240 | 10 | 230 | 0 | 230 |
| 7 | 1 | 66 | 100 | 330 | 1 | 76 |
| 8 | 1 | 44 | 50 | 380 | 1 | 126 |
| 9 | 1 | 106 | 40 | 420 | 1 | 166 |
| 10 | 1 | 146 | 40 | 460 | 1 | 206 |
| 11 | 1 | 186 | 200 | 660 | 2 | 152 |
| 12 | 1 | 226 | 40 | 700 | 2 | 192 |
| 13 | 2 | 12 | 40 | 740 | 2 | 232 |
| 14 | 2 | 52 | 80 | 820 | 3 | 58 |
| 15 | 2 | 92 | 40 | 860 | 3 | 98 |
| 16 | 2 | 132 | 40 | 900 | 3 | 138 |
| 17 | 2 | 172 | 150 | 1050 | 4 | 34 |
| 18 | 2 | 212 | 40 | 1090 | 4 | 74 |
| 19 | 2 | 252 | 60 | 1150 | 4 | 134 |
| 20 | 3 | 38 | 40 | 1190 | 4 | 174 |
| 21 | 3 | 78 | 10 | 1200 | 4 | 184 |
| 22 | 3 | 118 | 40 | 1240 | 4 | 224 |
| 23 | 3 | 158 | 40 | 1280 | 5 | 10 |
| 24 | 3 | 198 | 40 | 1320 | 5 | 50 |
| 25 | 3 | 238 | 40 | 1360 | 5 | 90 |

FIG. 7

FIREWALL PORT ACCESS RULE GENERATION

BACKGROUND

The present invention relates to the field of cloud computing, and more particularly heterogeneous networks across hybrid clouds. Cloud computing provides computing services that provide tenants virtual computer, storage, and internet connectivity services. Clouds systems can be classified as public, private or hybrid. A private cloud is a cloud infrastructure for one entity that is hosted either internally to the entity or externally, while a public cloud is a cloud infrastructure that is open to more than one entity. A hybrid cloud is two or more cloud systems that remain separate but are both accessible by an entity. Security of the cloud infrastructure is provided by a firewall that use a set of rules to determine the access and flow of information to and from the cloud infrastructure.

DETAILED DESCRIPTION OF EXAMPLES

Figure 1:
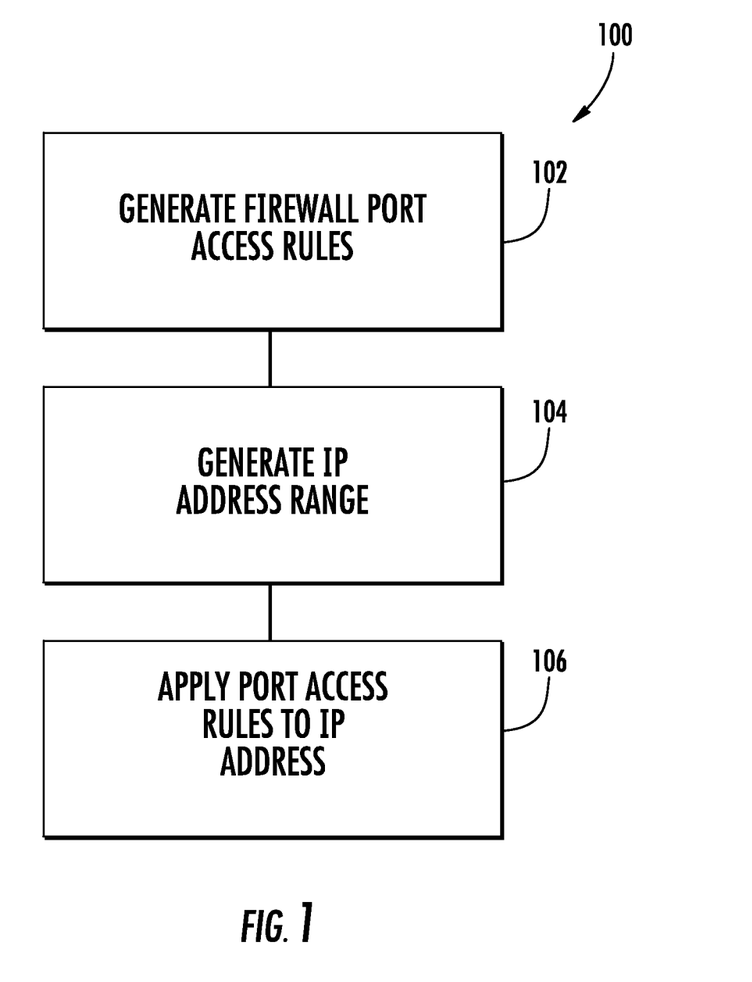
FIG. 1 is an illustration of a method of firewall port access generation apparatus.

FIG. 1 illustrates an example method 100 of generating firewall rules between a first cloud system and a second cloud system. In one implementation the first cloud system and second cloud system are of the same type. For example both the first cloud system and the second cloud system are VLAN systems. In one implementation the first cloud system is a VLAN system and the second cloud system is an OpenStack system. OpenStack is an open source cloud computing platform for public and private clouds. As shown by block 102, firewall port access rules are generated between the first cloud system and the second cloud system for each tenant. As shown by block 104, a unique IP address range is generated for each tenant of a plurality of tenants. As shown by block 106, the firewall port access rules shown by block 102 are applied to each IP address generated by block 104.

Figure 6:
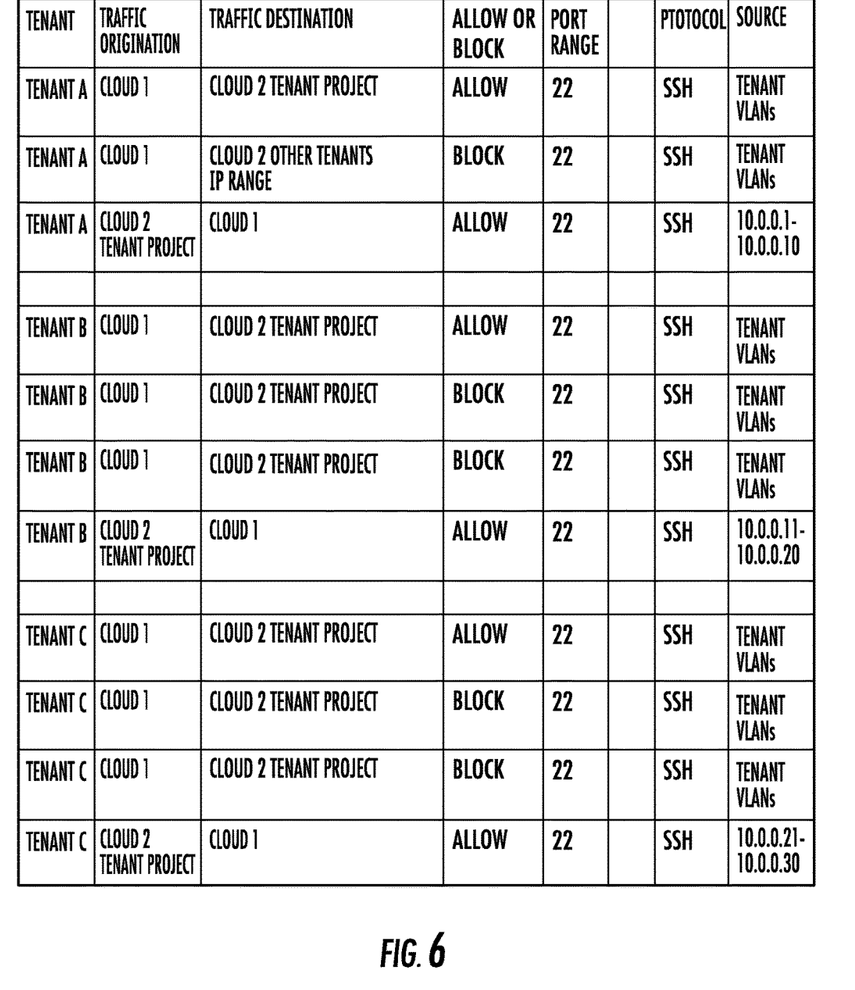
FIG. 6 is a chart illustrating firewall port access rules.

FIG. 6 includes a chart of the firewall port access rules for each tenant in a multi-tenant cloud environment. In one implementation the number of rules required is=2*V*N*P, where V=Number of different VLANS per tenant; N=Total number of tenants; and P=Number of ports requiring rules. In one implementation all ports/protocols and VLAN interconnectivity are blocked by default. In another implementation the administrator or entity is identifies which ports are blocked and which ports are not blocked.

For heterogeneous networks, firewall rules as isolation is now entrusted to a manually configured firewall. In one implementation all ports/protocols and VLAN interconnectivity are blocked by default. Therefore the challenge becomes automating the creation of a whitelist of allowed rules only.

In one embodiment the allowed traffic is defined by the following algorithm: For each port, for each VLAN, allow cloud provider A's compute nodes talk to cloud provider B's compute nodes, if the same tenant. In one embodiment these rules are duplicated to handle directional ingress vs. egress rules.

In the table shown in FIG. 6 the firewall rules for three tenants are illustrated. The list would grow as more tenants are added. In one implementation where the default of all flow is blocked until allowed, only the Allow rules need to be added for each port/protocol, for each VLAN, for each tenant. The algorithm to create the firewall rules preserve tenant isolation while promoting intra-tenant cross-cloud-provider interconnectivity. In one implementation in FIG. 6, Cloud 1 is a legacy compartment and Cloud 2 is an OpenStack-based compartment.

Figure 2:
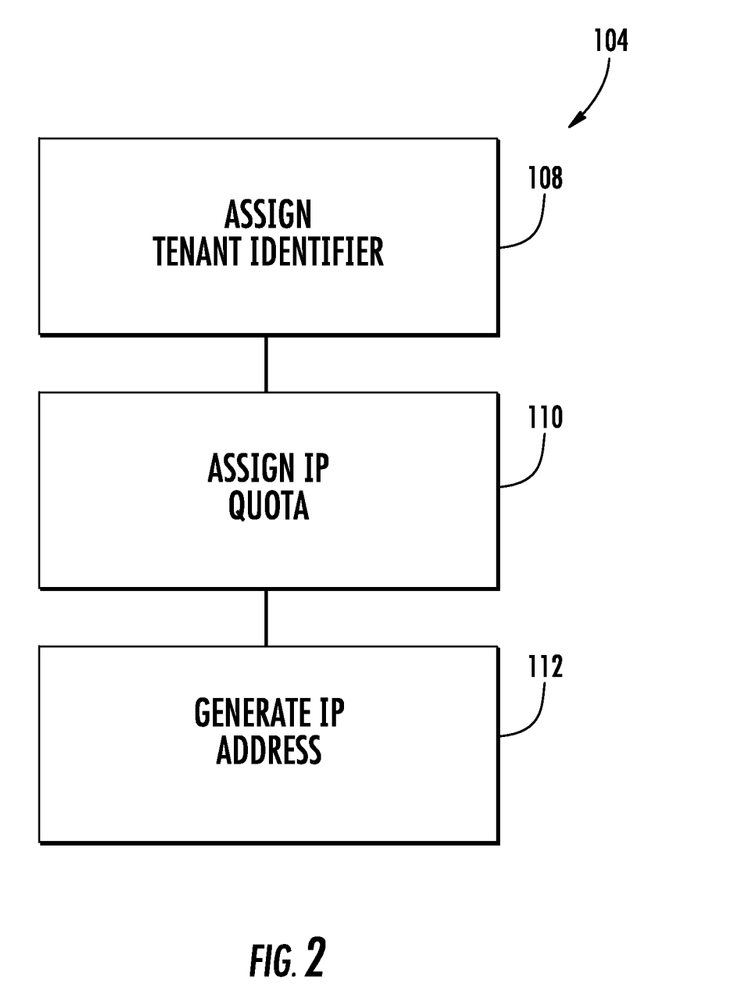
FIG. 2 is an illustration of a method for generating IP addresses for a tenant.

The firewall port access rules require specific IP address ranges to be specified for each VLAN of each tenant. An algorithm has been devised to automate IP address management and further facilitate the prior algorithm for firewall rules. FIG. 2 illustrates one implementation of generating a unique IP address range for each tenant. As shown by block 108 each tenant is assigned a unique tenant identifier. In one implementation the tenant identifier is a unique integer. Each tenant in a multi-tenant environment receives a unique identifier. As shown by block 110, each tenant is assigned an IP quota. In one implementation the IP quota is a fixed number such as 40. However other fixed numbers are also contemplated and may range from 1 to greater than 40. In one implementation the IP quota is variable and is chosen by the entity.

In one embodiment the IP address range is generated by an algorithm. The IP address for each tenant is necessary to compute the starting and ending octet values. Here we provide the formulas necessary to compute the ending 3rd and 4th octet values and the starting IPs are merely computed via subtraction from the ending IPs. A number known as the IP Integer is calculated as follows: $J_n = J_n - 1 + \Delta n$; where: Jn=IP Integer for tenant n; n=Tenant ID (Starting from 1); and Δ=IP quota for tenant n.

In one implementation the 3rd and 4th ending octet IP values are be computed as follows: $X = Quotient(J_n/M)$; and $Y = MOD(J_n/M)$. The Quotient function truncates any remainder, and the Mod function results in only the remainder. M=Max IP value for an octet=254 for IPv4. This function allows support for IPv6 by increasing the value of M.

Figure 7:
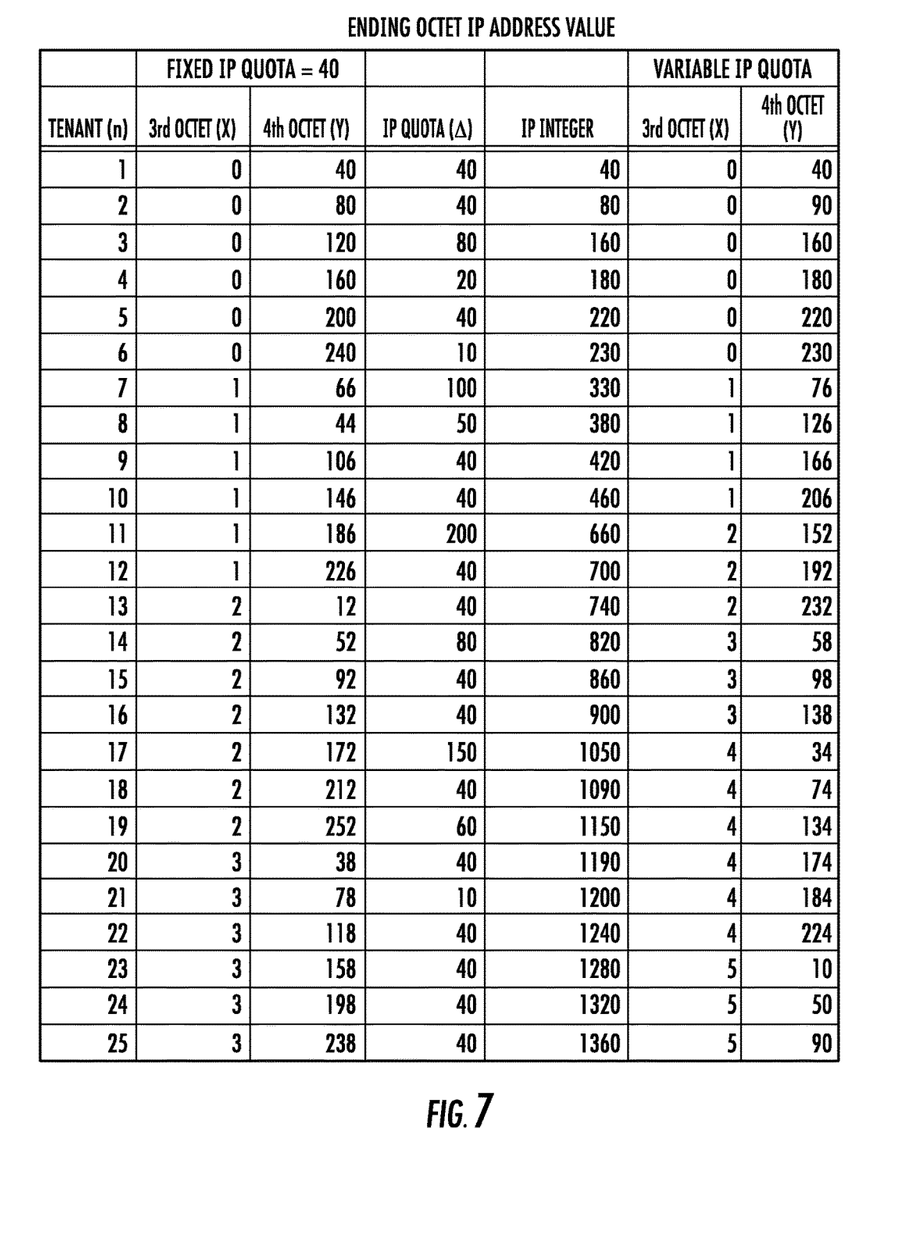
FIG. 7 is a chart illustrating generation of IP addresses.

Referring to FIG. 7 a table illustrates the generation of the IP addresses for the first 25 tenants based on the foregoing algorithm for both a fixed IP quota of 40 and for a variable IP quota is provided in the table.

After the firewall port access rules are generated and the IP address range has been generated as provided hereinabove, the port access rules are applied to each IP address.

Figure 3:
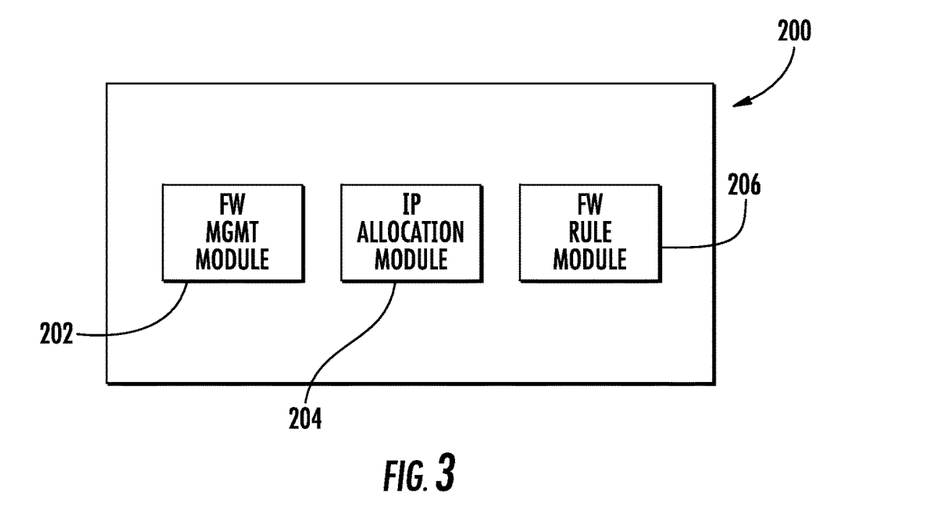
FIG. 3 is a schematic diagram of a device for firewall rule generation.

Referring to FIG. 3 an apparatus for firewall rule generation 200 includes memory including a non-transitory computer-readable medium containing instructions for a processor. The non-transient computer-readable medium or other persistent storage device, include volatile memory such as DRAM, or some combination of these; for example a hard disk combined with RAM. Memory contains instructions for directing the carrying out of functions and analysis by one or more processors. In some implementations, memory further stores data for use by the one or more processors.

Memory stores various software or code modules that direct processor to carry out various interrelated actions. In the example illustrated, the memory includes three modules.

The first module 202 is firewall management module that includes instructions to create firewall port access rules as discussed above and summarized in table 6. The second module 204 is an IP allocation module that includes instructions when carried out by a processor to create IP address range as discussed above and summarized in table 7. The third module 206 includes instructions to apply the port access rules resulting from the instruction in firewall port access rules module 202 to the IP addresses resulting from the instruction in the IP allocation module 204.

Figure 4:
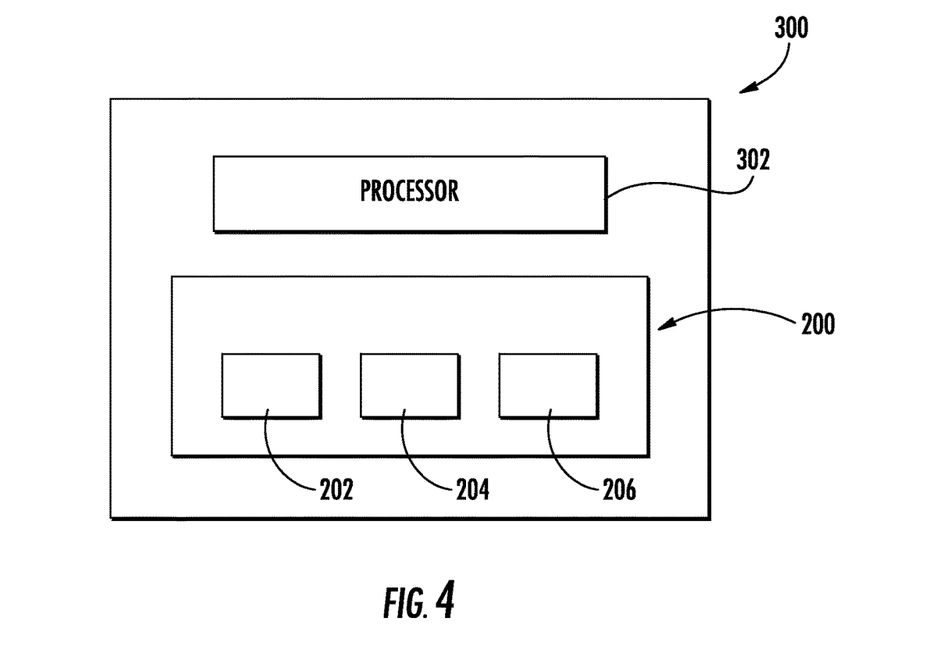
FIG. 4 is a schematic diagram of an apparatus for firewall rule generation.

Referring to FIG. 4 a device 300 for creating firewall rules include a processor 302 and memory 200. One or more processors 302 include one or more processing units configured to carry out instructions contained in memory 200. In general, following instructions contained in the modules 202, 204 and 206, the firewall port access rules are generated, the IP address range is allocated; and the firewall port access rules are applied to each of the IP addresses.

For purposes of this application, the term "processing unit" shall mean a presently developed or future developed processing unit that executes sequences of instructions contained in a memory. Execution of the sequences of instructions causes the one or more processing units to perform steps such as generating control signals. The instructions may be loaded in a random access memory (RAM) for execution by the one or more processing units from a read only memory (ROM), a mass storage device, or some other persistent storage. In other embodiments, hardwired circuitry may be used in place of or in combination with software instructions to implement the functions described. Unless otherwise specifically noted, the firewall rule generation is not limited to any specific combination of hardware circuitry and software, nor to any particular source for the instructions executed by the one or more processing units.

As discussed above memory 200 includes a non-transient computer-readable medium or other persistent storage device, volatile memory such as DRAM, or some combination of these; for example a hard disk combined with RAM.

In one implementation a user interface is used by a tenant or system administrator to enter certain parameters as required in the method of generating firewall access rules and/or generating a unique IP address range. For example in one implementation the IP quota is entered by a user via a user interface as is known in the art.

Figure 5:
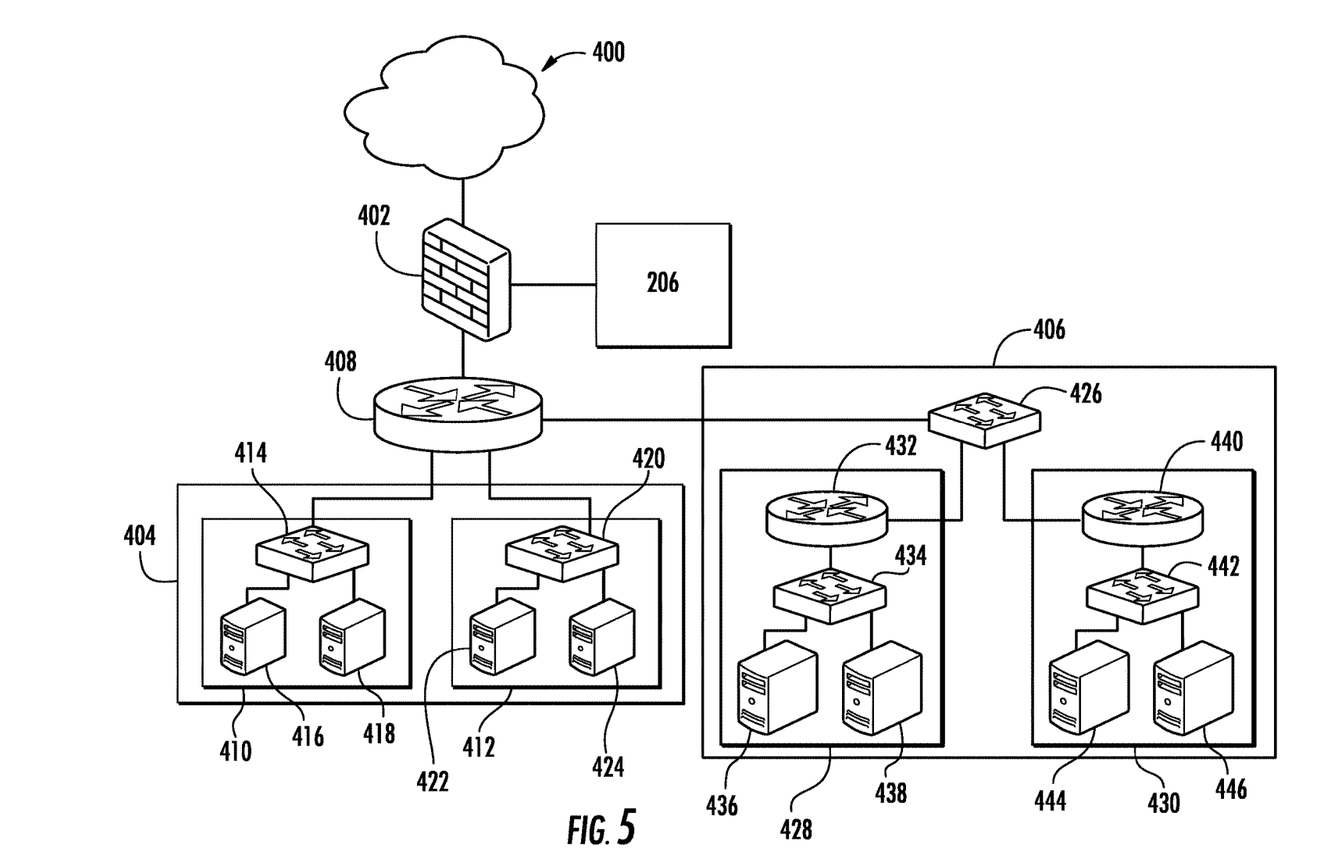
FIG. 5 is a schematic diagram of the use of the firewall port access rule generation in a multi cloud environment.

Referring to FIG. 5 one implementation o in which the firewall rule generation operates is shown. An operator accesses a first cloud system 404 and a second cloud system 406 via the internet 400. A firewall 402 receives instructions from the internet to access the first could system 404 and/or the second cloud system 406. In one implementation first cloud system 404 is of one type of a VLAN and second cloud system is of a second type for example OpenStack. The first cloud system 404 has certain hardware that operates in the first cloud system type, and the second cloud system 406 includes hardware that operates in the second cloud system type. The firewall rule generation allows access for the tenants to this hybrid cloud environment including a first cloud system of one type and a second cloud system of a second type. In one implementation the firewall rule generation provides firewall rules to more than two cloud systems.

A tenant can access both the first cloud system 404 and the second cloud system 406 in a seamless manner based on the firewall rule generator 206 as discussed hereinabove. Firewall 402 communicates with firewall module 206. As a request is received from internet 400 the firewall based on the firewall rules from module 206 directs the information to router 408 to be directed either toward the first cloud system 404 or the second cloud system 406. The information is then directed to either switch 414 or 420 depending on where the tenant IP address. In one implementation servers 410 and 418 include information and programming for a first tenant and servers 412 and 424 include information and programming for a second tenant. Similarly, second cloud 406 also includes information and programming for first tenant on servers 436 and 438 identified as reference numeral 428 in second cloud 406. Switch 426 in second cloud 406 directs the information to the appropriate router or server for the particular client.

The implementation of the firewall port access rules using the algorithms enable inter-tenant isolation and intra-tenant connectivity across mixed infrastructure network architectures. The algorithm generated application of the firewall port access rules to the IP addresses eliminate errors and provides for the quick scaling and addition of additional tenants to the multi-tenant cloud system.

Referring to FIG. 5 in one implementation apparatus 300 includes module 206 and is physically located in the same space. In one implementation apparatus 300 is remote from firewall 402 and provides the firewall port access rules applied to the IP addresses for all of the tenants that can access and send information to the first cloud 404 and the second cloud 406.

In one implementation the algorithms described herein for generation of the firewall port access rules and the generation of IP addresses is a computer based system including a processor and memory and described above.

While the preferred embodiments of the invention have been illustrated and described, it will be appreciated that various changes can be made therein without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though may be used conjunction with the description of certain specific embodiments of the present invention.

What is claimed is:
1. A method comprising:
generating firewall port access rules between a first cloud system a second cloud system for each tenant of a plurality of tenants;
generating a unique IP address range for each tenant, wherein generating the unique IP address range for each tenant includes generating a third IP address octet value for each tenant using a quotient function by:
dividing an IP integer for each tenant by a maximum IP octet value of a particular internet protocol; and
truncating, in response to a remainder from the quotient function occurring, the remainder; and
applying the firewall port access rules to each IP address.

2. The method of claim 1, wherein the first cloud system is first type and the second cloud system is a second type different than the first type.

3. The method of claim 1, wherein generating the firewall port access rules is based at least in part on:
the number of cloud systems for each tenant;
the total number of tenants; and
the number of ports required to access the cloud systems for each tenant.

4. The method of claim 1, wherein generating IP addresses is a function of at least a unique tenant identifier and an IP quota for each tenant.

5. The method of claim 4, wherein the IP quota for each tenant is variable.

6. The method of claim 1, wherein generating IP addresses includes generating a fourth IP address octet value for each tenant as a remainder function of the IP addresses as a function of the IP integer for each tenant and the maximum IP value for the given internet protocol.

7. An apparatus comprising;
a non-transitory computer-readable medium containing instructions executable by a processor to cause the processor to:
generate port access rules between at least a first cloud system and a second cloud system for each tenant of a plurality of tenants;
generate a unique IP address range for each tenant, wherein generating the unique IP address range for each tenant includes generating a third IP address octet value for each tenant as a quotient function by:
dividing an IP integer for each tenant by a maximum IP octet value of a particular internet protocol for the IP address range; and
truncating, in response to a remainder from the quotient function occurring, the remainder; and
apply the port access rules to each IP address.

8. The apparatus of claim 7, wherein the tangible non-transitory computer readable medium further includes instructions to generate the port access rules based at least in part on:
the number of cloud systems for each tenant;
the total number of tenants; and
the number of ports required to access the cloud systems for each tenant.

9. The apparatus of claim 7, wherein the tangible non-transitory computer readable medium further includes instructions to generate the unique IP address range at least in part on a unique tenant identifier and an IP quota for each tenant.

10. The apparatus of claim 7, wherein the tangible non-transitory computer readable medium further includes instructions to generate the ending third and fourth octet values and a starting IP address.

11. The apparatus of claim 10, wherein the tangible non-transitory computer readable medium further includes instructions to generate a fourth IP address octet value as a remainder function of the IP addresses as a function of the IP integer for each tenant and the maximum IP value for the particular internet protocol.

12. A device for creating firewall port access rules comprising;
a processor; and
a non-transitory computer-readable medium operatively coupled to the processor, the computer readable medium having computer readable instructions stored thereon that, when executed by the processor, causes the device to:
generate firewall port access rules between at least a first cloud system and a second cloud system for each tenant of a plurality of tenants;
generate a unique IP address range for each tenant, wherein generating the unique IP address range for each tenant includes generating a third IP address octet value for each tenant as a quotient function by:
dividing an IP integer for each tenant by a maximum IP octet value of a particular internet protocol; and
truncating, in response to a remainder from the quotient function occurring, the remainder; and
apply the firewall port access rules to each IP address.

13. The device of claim 12, wherein the tangible non-transitory computer readable medium further includes instructions to generate the firewall port access rules based at least in part on:
the number of cloud systems for each tenant;
the total number of tenants; and
the number of ports required to access the cloud systems for each tenant.

14. The device of claim 12, wherein the tangible non-transitory computer readable medium further includes instructions to generate the unique IP address range at least in part on a unique tenant identifier and an IP quota for each tenant.

15. The device of claim 12, wherein the tangible non-transitory computer readable medium further includes instructions to generate a fourth IP address octet value for each tenant as a remainder function of the IP addresses as a function of the IP integer for each tenant and the maximum IP value for the particular internet protocol.

* * * * *